US011511492B2

(12) United States Patent
Riss et al.

(10) Patent No.: US 11,511,492 B2
(45) Date of Patent: Nov. 29, 2022

(54) THREE-DIMENSIONALLY PRINTED OBJECT

(71) Applicants: Instituto Atlantico, Fortaleza (BR); Hewlett-Packard Development Company, L.P., Spring, TX (US)

(72) Inventors: Marcelo Aita Riss, Porto Alegre (BR); Thiago B. Lima de Moura, Fortaleza (BR); Alyne Gomes Soares Cantal, Fortaleza (BR); Ana Patricia Del Angel, Guadalajara (MX); Jun Zeng, Palo Alto, CA (US); Scott White, Boise, ID (US); Sebastia Cortes i Herms, Sant Cugat del Valles (ES)

(73) Assignees: Instituto Atlântico, Fortaleza (BR); Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 16/612,945

(22) PCT Filed: Aug. 1, 2017

(86) PCT No.: PCT/US2017/044872
§ 371 (c)(1),
(2) Date: Nov. 12, 2019

(87) PCT Pub. No.: WO2019/027446
PCT Pub. Date: Feb. 7, 2019

(65) Prior Publication Data
US 2020/0164584 A1 May 28, 2020

(51) Int. Cl.
B29C 64/393 (2017.01)
B33Y 50/02 (2015.01)
B33Y 80/00 (2015.01)

(52) U.S. Cl.
CPC ............. *B29C 64/393* (2017.08); *B33Y 50/02* (2014.12); *B33Y 80/00* (2014.12)

(58) Field of Classification Search
CPC ....... B29C 64/393; B33Y 50/02; B33Y 80/00; B65D 85/70; B65D 5/4225; B65D 73/0035; B65D 81/09
See application file for complete search history.

(56) References Cited

U.S. PATENT DOCUMENTS 9,636,871 B2 * 5/2017 Butler .................. G06F 3/1288
10,686,963 B1 * 6/2020 Rodriguez ......... H04N 1/32261
(Continued)

FOREIGN PATENT DOCUMENTS

CN 101642810 2/2010
CN 102574331 7/2012
(Continued)

OTHER PUBLICATIONS

Bailey, C., S. et al. "3D-printing and electronic packaging-current status and future challenges." In 2016 IEEE 18th Electronics Packaging Technology Conference (EPTC), pp. 1-4. IEEE, 2016.
(Continued)

*Primary Examiner* — Thomas C Lee
*Assistant Examiner* — Ameir Myers
(74) *Attorney, Agent, or Firm* — Dicke Billig & Czaja PLLC

(57) ABSTRACT

A method of manufacturing an object via three-dimensional printing is disclosed. Data regarding the object is received. The object is three-dimensionally printed from the data. A wrapper is also three-dimensionally printed from the data. The wrapper encloses the object and includes information regarding the object.

13 Claims, 3 Drawing Sheets

(56) References Cited

U.S. PATENT DOCUMENTS

| | | |
|---|---|---|
| 2012/0183701 A1 | 7/2012 | Pilz et al. |
| 2014/0058959 A1 | 2/2014 | Isbjornssund et al. |
| 2014/0061974 A1 | 3/2014 | Tyler |
| 2015/0096266 A1* | 4/2015 | Divine .................... A61J 1/03 53/452 |
| 2015/0128528 A1 | 5/2015 | Lacaze et al. |
| 2015/0145158 A1* | 5/2015 | Levine ................ B29C 64/393 264/40.1 |
| 2015/0352885 A1 | 12/2015 | See et al. |
| 2016/0067927 A1 | 3/2016 | Voris et al. |
| 2017/0060489 A1* | 3/2017 | Sato .................. H04N 1/00408 |
| 2017/0173889 A1* | 6/2017 | Thomas-Lepore ... H04L 51/046 |
| 2017/0253354 A1 | 9/2017 | Colson et al. |
| 2017/0253401 A1* | 9/2017 | Bouthillier ............. B33Y 80/00 |
| 2018/0094953 A1* | 4/2018 | Colson .................. G01D 9/005 |
| 2018/0104898 A1* | 4/2018 | Lameris ................ B29C 64/20 |
| 2018/0141685 A1* | 5/2018 | Colson ................ B29C 64/153 |
| 2018/0253080 A1* | 9/2018 | Meess ................ G05B 19/4099 |
| 2018/0339456 A1* | 11/2018 | Czinger ............... B29C 64/379 |
| 2019/0026397 A1* | 1/2019 | Barnes ............... G06Q 30/0621 |
| 2020/0233399 A1* | 7/2020 | Meess .................. B29C 64/386 |

FOREIGN PATENT DOCUMENTS

| | | |
|---|---|---|
| CN | 103142317 A | 6/2013 |
| CN | 106965417 A | 7/2017 |
| EP | 2701090 A1 | 2/2014 |
| WO | WO-2015185929 | 12/2015 |
| WO | 2016/038356 A1 | 3/2016 |

OTHER PUBLICATIONS

Butschli, Jim "3D printing's promise for medical devices", Posted, Jan. 8, 2015, Available at: < https://www.packworld.com/article/trends-and-issues/3d-printingadditive-manufacturing/3d-printings-promise-medical-devices >.

Lingle, Rick "3d-printing Expert Shares Packaging Insights", Posted Oct. 19, 2015. Available at: < http://www.packagingdigest.com/digital-printing/3d-printing-expert-shares-packaging-insights >.

Quickparts; "Rapid Manufacturing/SLS Design Guide"; Retrieved from Internet Jun. 2017, Available at: www.quickparts.com.

* cited by examiner

THREE-DIMENSIONALLY PRINTED OBJECT

BACKGROUND

Three-dimensional printing, also referred to as additive manufacturing, is a process used to create three-dimensional objects including articles and devices in which layers of material are formed under computer control. In one example, three-dimensionally printed objects can be of many shapes and geometry and are produced from a three-dimensional model or other data source such as an Additive Manufacturing Format (AMF) data file, StereoLithography (STL) data file, or other data format for describing the object. While three-dimensional printing has referred to a process to deposit layer upon layer of a binder material onto a powder bed with printer head, three-dimensional printing and additive manufacturing can encompass a wider variety of manufacturing techniques. For example, three-dimensional printing and additive manufacturing can include binder jetting, directed energy deposition, material extrusion, material jetting, powder bed fusion, sheet lamination, and vat photopolymerization.

DETAILED DESCRIPTION

Figure 1:
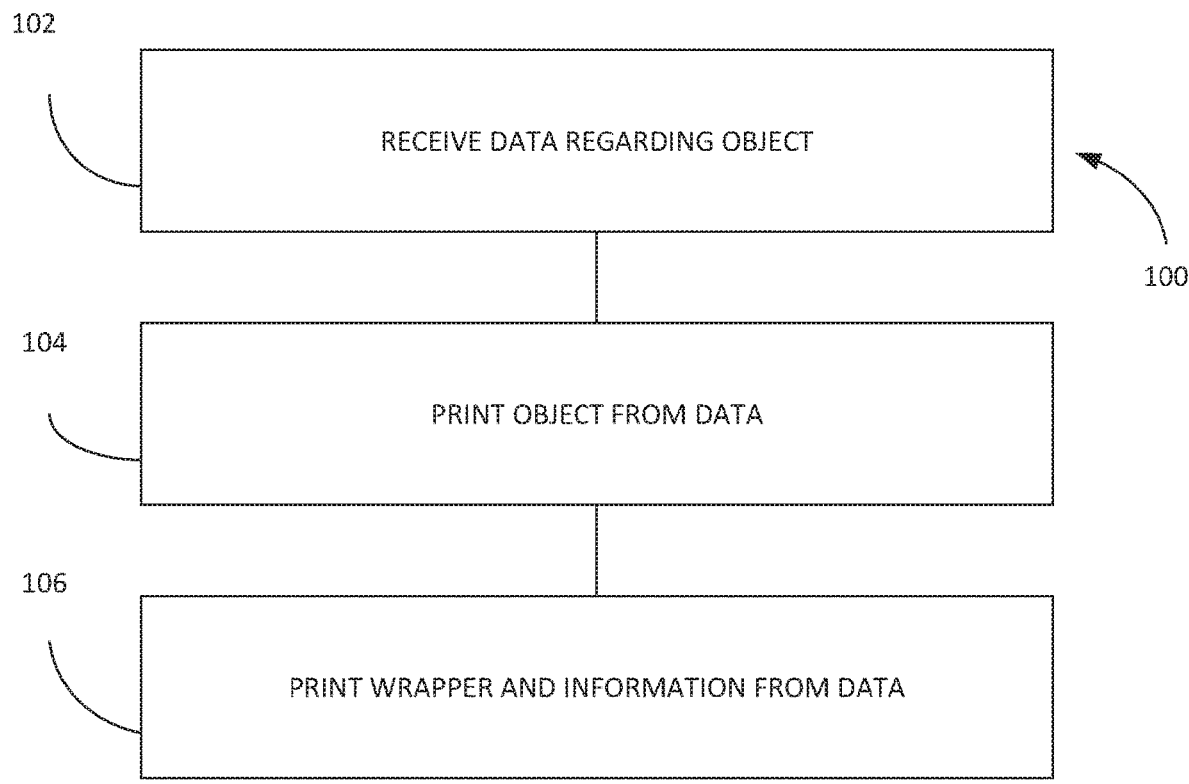
FIG. 1 is a block diagram illustrating an example method.

Additive manufacturing includes several benefits over conventional production methods and technologies; among these benefits include customization, convenience, and efficiency. For example, simple modifications to a computer-aided design (CAD) file can produce new variations to an object in a relatively short amount of time. The variations can be produced in house rather than having to rely on remote production facility to create and then ship each object, and additive manufacturing can be far more cost effective for producing prototypes than traditional manufacturing techniques. The more quickly a company can create and test prototypes, the more quickly it can settle on a final design, and up until recently, roughly three-quarters of three-dimensional printing was directed toward prototyping. With recent developments to additive manufacturing, a transition is underway in which more three-dimensionally printed objects are being mass manufactured for finished products. Many new developments to three-dimensional printing are directed toward mass manufacturing objects more quickly, more cost effectively, and at scale.

Mass manufacturing with three-dimensionally printed objects as parts generally includes a three-phase pipeline. During a modeling phase, the object is designed often with a CAD or similar tool. In some examples, the design of the object may be tested using a computer-aided simulation. Once the design is complete, it can be passed to a preparation phase. During the preparation phase, the design is validated to determine whether an object can be fabricated from the design based on set of fabrication rules that may include rules particular to the additive manufacturing techniques or three-dimensional printers. If the object cannot be fabricated, design changes may be proposed based on the rules and the process returns to the modeling phase. Once the design is complete, the object can be sliced to facilitate layer fabrication.

The third phase is production and includes three-dimensionally printing the object. This phase can include pre-printing aspects such as placing a manufacturing order into an enterprise resource planning (ERP) system to generate an order identifier and a part identifier; production planning including scheduling and machine assignment; fabrication of the object; post fabrication including powder removal; and quality assurance. Once complete, the parts can be assembled into final device, and packaged for shipping and sale.

During one or more stages of mass manufacturing of the object, information regarding the object may be created, modified, or read to enhance production efficiency. In one example, order information for order tracking can be assigned to correspond with the object. Associating information with an object becomes a challenge after a design in digital form has been converted to an object in physical form, such as after three-dimensionally printing the object. The variance of shapes of different objects makes it difficult to impose machine-readable codes or other images or text based information onto the object via three-dimensional printing. Further, post fabrication techniques can remove or corrupt such codes, images, or text. In some cases in which the information is for production management purposes, the object may be intended to be free of any extraneous codes, images, or text.

FIG. 1 illustrates an example method 100 of manufacturing an object via three-dimensional printing. Data regarding the object is received at 102, such as at a three-dimensional printer. The object is three-dimensionally printed from the data at 104, such as with the three-dimensional printer. A wrapper is also three-dimensionally printed from the data at 106, such as with the three-dimensional printer. As part of 106, the wrapper encloses the object and includes information regarding the object.

In one example, the data received at the three-dimensional printer at 102 includes an amalgamation of several components of a data file. For example, the data can include design data regarding the design of the object, dimension data regarding the design of the wrapper, and the information that can include codes, images, or text to be included on the wrapper. The data can be presented to the three-dimensional printer in a manner that is suitable for the three-dimensional printer to co-manufacture the object and wrapper together, or to co-manufacture the object, wrapper, and information together, e.g., simultaneously printing the items together with a single device rather than separately printing the object and wrapper with different devices or at separate times.

Various additive-manufacturing techniques can be applied to three-dimensionally print the object and the wrapper at 104, 106. In one example, the object and wrapper can be printed at 104, 106 via a three-dimensional printer. The three-dimensional printer can deposit a powder or other material onto a print bed using a printbar having a set of nozzles to generate individual voxels (a three-dimensional analog of a pixel in two-dimensional printing). The nozzles spray droplets of a material (such as a thermoplastic, conductor, or other material) on the print bed in a specified pattern according to the data to form the object and wrapper in layers as the printbar moves back and forth relative to the print bed. The three-dimensional printer can co-generate the object with the wrapper.

The wrapper can be formed in various configurations to enclose the object at 106. In one example, printing the wrapper at 106 includes printing a six-sided box or cage that surrounds the objects. In one example, the wrapper can include a box or other structure to substantially occlude the object for security purposes, such as to keep the object from user view during manufacturing. Also, the cage can include a plurality of bars having a selected width to each bar and spacing between the bars that can prevent the object from escaping the cage as well as other considerations such as to allow media to enter and clean or other process the object such as part of post fabrication. In some examples, the wrapper can include snap off sides or doors to allow relatively easy intended removal of the object from the wrapper. The dimension data used to three-dimensionally print the wrapper can be automatically generated from specifications of the design data of the object including the height, width, and length of the object in three dimensions. In some examples, the wrapper can be a simple three-dimensionally printed strap surrounding the object and a flap to include the information.

As part of 106, the information can be included on the wrapper. In one example, the wrapper can be printed to include a generally smooth surface on which to include the information at 106. For example, the wrapper can include a flat, opaque, outwardly facing surface on which the information in the form of machine readable or human readable indicia can be included. In one instance, the information is printed on the surface with a flat marker (such as an ink of color in contrast with the wrapper) or affixed to the surface (such as a label) after the wrapper is created. In another instance, the information is printed on the wrapper as the wrapper is being generated. For example, the information can be in the form of a two-dimensional raised bar code created as part of the three-dimensional printing process. The information can be included on the wrapper in a contrasting material to facilitate reading the information. In another example, the information can be included as part of a radio-frequency identification (RFID) tag that is three-dimensionally printed as part of the wrapper.

Figure 2:
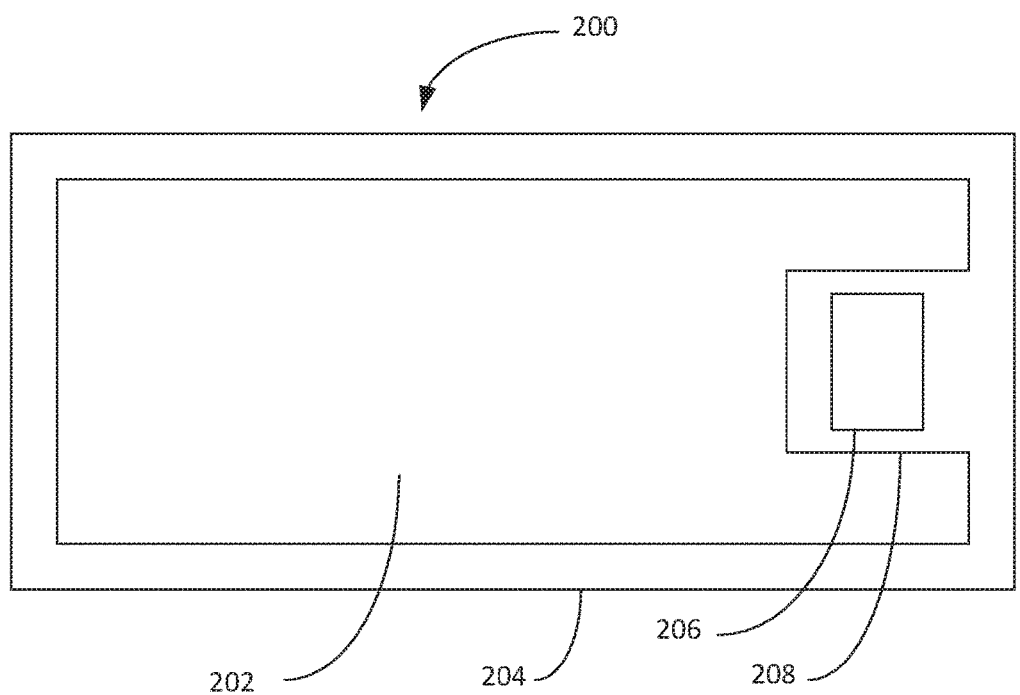
FIG. 2 is a block diagram illustrating an example device and wrapper manufactured according to the method of FIG. 1.

FIG. 2 illustrates an example device 200, which can be formed via the example method 100. The device 200 includes a three-dimensionally printed object 202 and a three-dimensionally printed wrapper 204 enclosing the three-dimensionally printed object 202. The wrapper 204 includes information 206 regarding the object 202. In the example, the wrapper 204 includes a three-dimensionally printed surface 208, or tag, on which the information 206 is included. The information 206 can be of machine readable or human readable indicia and can include a code, image, or text.

In one example, the three-dimensionally printed object 202 is the subject of the mass manufacturing, and the wrapper 204 can discarded or recycled and not included as part of the final assembly or consumable product. For example, the wrapper 204 including the information 206 is intended to track the manufacturing order and is distinct from the shipping container or product packaging. In one example, one or more objects, such as object 202, can be enclosed within a single wrapper 204. In one instance of this example, the information 206 on the wrapper 204 pertains to each of the objects 202 enclosed within the wrapper 204. For example, the information 206 can include specifics regarding the job ticket for the object, which may be useful in the mass-manufacturing context.

In one example, one or more objects 202 can be enclosed within the wrapper 204, and the wrapper can include information 206 regarding each of the enclosed objects. Still further, one or devices 200 can be included within one or more additional wrappers that can include a second set of information (not shown). The object 202 can be removed from the wrapper 204 without affecting the object 202.

Figure 3:
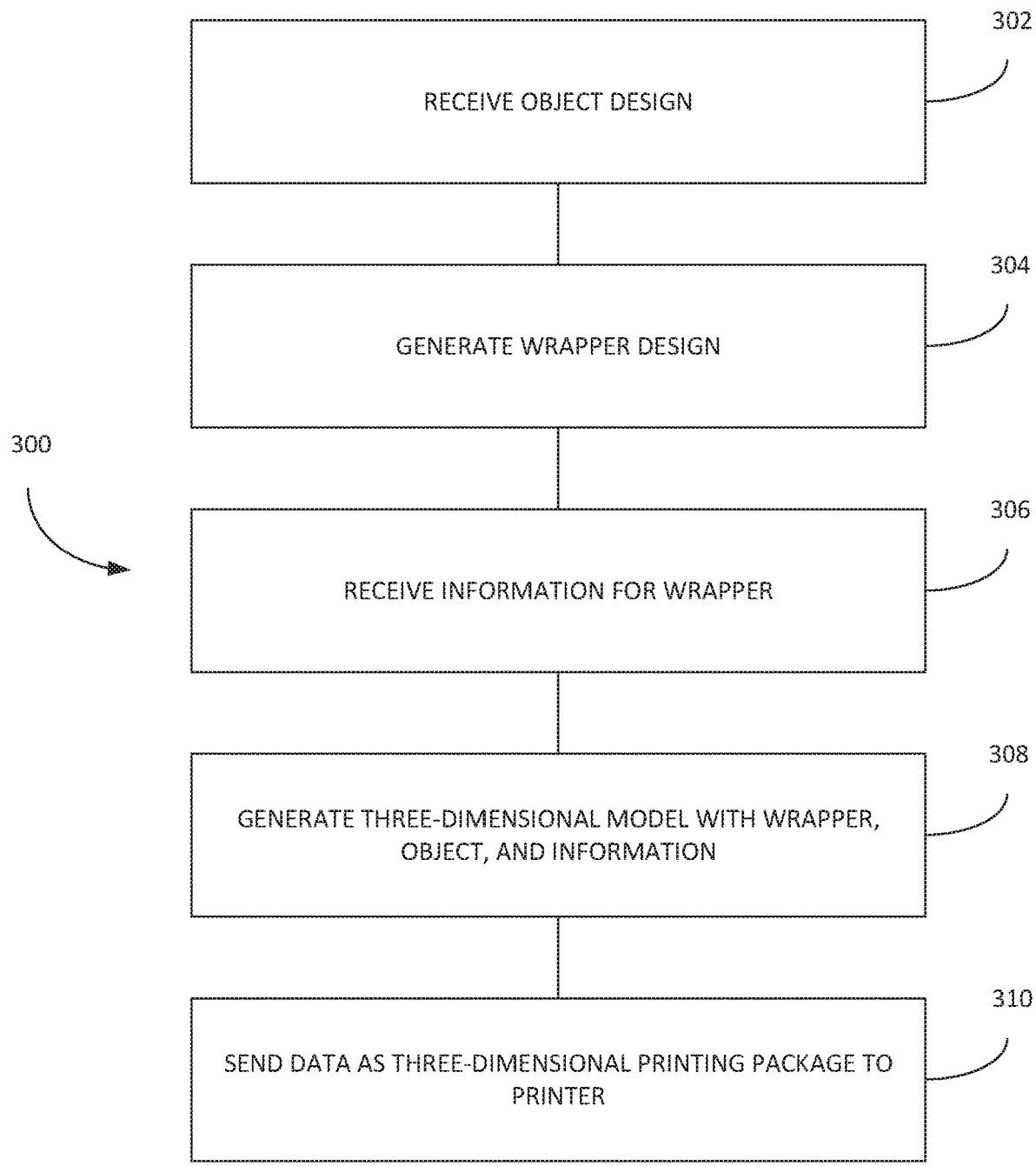
FIG. 3 is a block diagram illustrating an example method of the method of FIG. 1.

FIG. 3 illustrates an example method 300 for generating the data to be sent to a three-dimensional printer to generate device 200. In one example, the method 300 can be implemented as part of the three-phase mass-manufacturing pipeline, such as part of the preparation phase after the object design is validated.

The object design for three-dimensional printing an object 202 is received at 302. In one example, the object design for three-dimensional printing can include a design to print multiple objects at once. The object design can be in the form of a CAD file or in an AMF data file and received from a memory device on a network. In another example, the object design can be locally developed as part of method 200.

A wrapper design for three-dimensionally printing the wrapper 204 is generated at 304. In one example, the generation of the wrapper design at 304 is automatic based on the dimensions of the object 202 from the object design. In another example, the generation of the wrapper at 304 is semiautomatic, such as a designer is able to select certain features of the wrapper from a list of available features. In one example, the designer can select whether the wrapper 204 will be a box, cage or other form of enclosure and the particular location for the surface 208 on which to include the information 206. In still another example, the generation of the wrapper can be fully manual design in which the user designs the wrapper 202 from scratch.

Information for inclusion on the wrapper is received at 306. In one example, the designer of the wrapper can generate the information for inclusion on the wrapper surface 206. In another example, a system implementing 306 can access an ERP system or other database component to receive the information to be included as part of the wrapper design. The design of the surface of the wrapper can be selected or adjusted to accommodate the form of the information, whether it is machine readable or human readable, and the amount of information on the wrapper.

A three-dimensional model of the wrapper including the information and enclosing the object is generated at 308. In one example, the three-dimensional model can include a data file that can be read by a three-dimensional printer to generate the device 200 or further processed to be read by the three-dimensional printer. The data file can include data regarding the co-manufacture of the object, wrapper and information. The data file, once processed in a form for the three-dimensional printer, is provided to the printer at 310.

Figure 4:
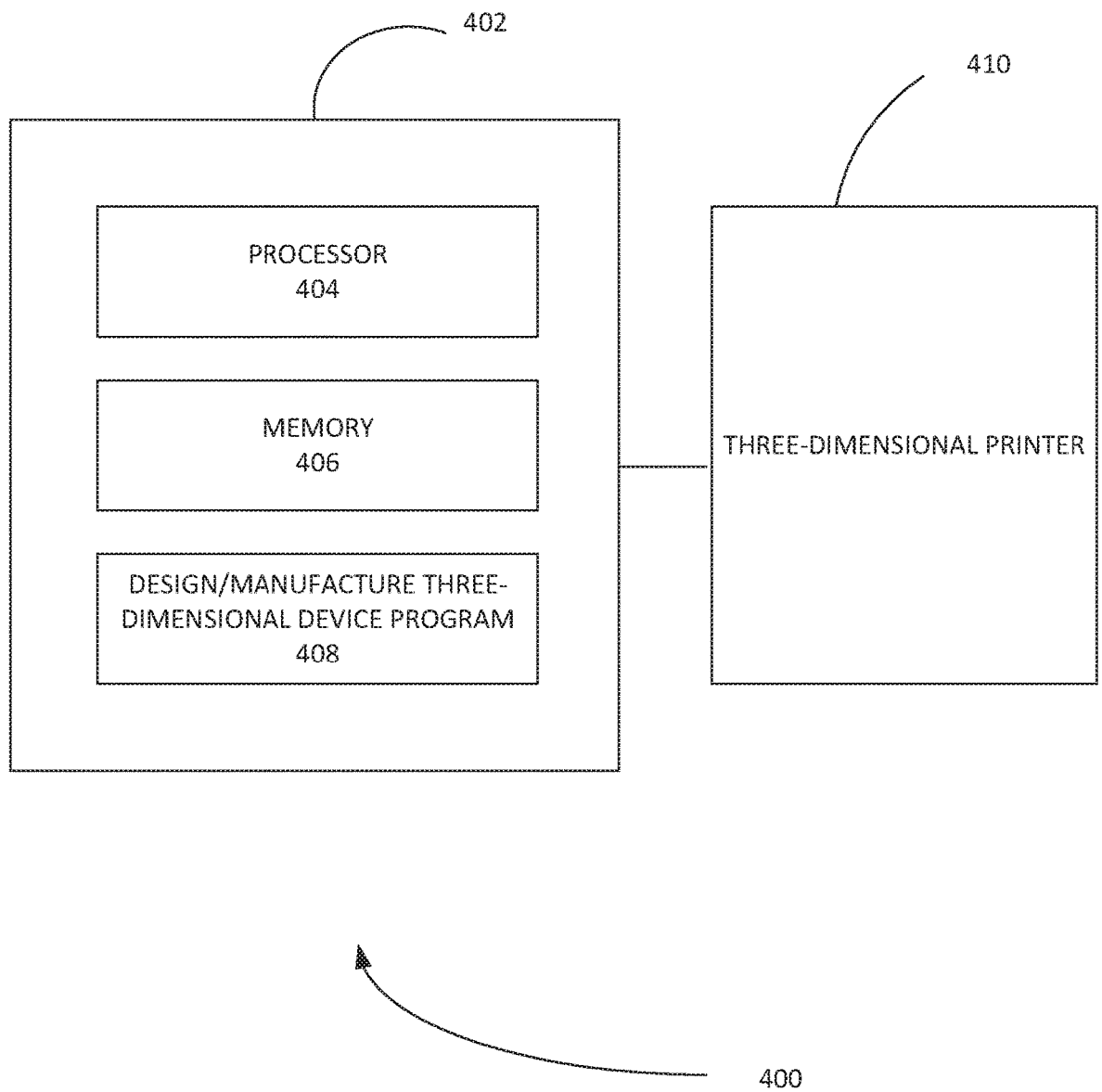
FIG. 4 is a block diagram illustrating an example system for implementing the example methods of FIGS. 1 and 3 to manufacture the example device of FIG. 2.

FIG. 4 illustrates an example system 400 including a computing device 402 having a processor 404 and memory 406 and program 408 in which the computing device 402 is operably coupled to a three-dimensional printing device 410 via a direct connection or over a network to implement example methods 100, 300 and generate device 200. Program 408 can be implemented as a set of processor-executable instructions stored on a non-transitory computer readable medium. Computer readable media, computer storage media, or memory may be implemented to include a combination of one or more volatile or nonvolatile computer storage media or as any suitable method or technology for storage of information such as computer readable instructions, data structures, program modules or other data. A propagating signal by itself does not qualify as storage media or a memory device.

System 400 is configured to receive or generate design data, such as a CAD file, regarding the object into memory 406. Additionally, system 400 is configured to receive data into memory 406 regarding the information 206 to be printed on wrapper 204. In one example, a user is able to manipulate the design of the wrapper and the placement of the information with the computing device via an input device such as a keyboard or pointing device. The program 408 can generate a data file incorporating the design of the object, the wrapper and the information into a form readable and usable by the three-dimensional printing device 410, which applies the data file to manufacture the device 200.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of manufacturing an object, the method comprising:
   receiving data regarding the object and a wrapper to enclose the object at a three-dimensional printer, the data including design data for three-dimensionally printing the object including specifications of the object readable by a printer;
   three-dimensionally printing the object from the data with the printer; and
   three-dimensionally printing the wrapper from the data and co-generated with the object with the printer, the wrapper enclosing the object based on dimension data of the wrapper automatically generated at the printer from the specifications of the object in the design data, the wrapper including information regarding the three-dimensionally printed object.

2. The method of claim 1 wherein the information includes machine-readable information and human readable information.

3. The method of claim 1 wherein the information includes a job ticket.

4. The method of claim 1 wherein the information is automatically generated based on the data via access to a database.

5. The method of claim 1 wherein three-dimensionally printing the object includes three-dimensionally printing a plurality of objects and wherein three-dimensionally printing the wrapper includes three-dimensionally printing one wrapper around the plurality of objects.

6. The method of claim 1 wherein three-dimensionally printing the wrapper includes co-manufacturing the wrapper with the object.

7. A co-manufactured device, comprising:
   a selected amount of three-dimensionally printed objects, the selected amount based on a job ticket; and
   a three-dimensionally printed wrapper enclosing the selected amount of three-dimensionally printed objects, the wrapper including information regarding the three-dimensionally printed device and the job ticket;
   wherein data regarding the objects and the wrapper to enclose the object are received at a three-dimensional printer, the data including design data for three-dimensionally printing the object including specifications of the object readable by the three-dimensional printer; and
   wherein the wrapper is three-dimensionally printed from the data and co-generated with the three-dimensionally printed objects via the printer, the wrapper enclosing the objects based on dimension data of the wrapper automatically generated at the printer from the specifications of the object in the design data.

8. The co-manufactured device of claim 7 wherein the wrapper is a three-dimensionally printed cage enclosing the three-dimensionally printed object.

9. The co-manufactured device of claim 7 wherein the wrapper includes a generally opaque surface having the information.

10. The co-manufactured device of claim 9 wherein the information of the surface includes machine-readable data.

11. The co-manufactured device of claim 7 wherein the selected amount of three dimensionally printed objects are enclosed within a plurality of three-dimensionally printed wrappers.

12. A method of manufacturing with a three-dimensional printer, the method comprising:
    receiving a data file regarding a job ticket for a plurality of objects and a wrapper to enclose the objects at the three-dimensional printer, the data file including design data for three-dimensionally printing the object including specifications of the object and access to label data from the job ticket;
    three-dimensionally printing the plurality object from the design data and based on the job ticket in the data file;
    three-dimensionally printing the wrapper from the data and co-generated with the three-dimensionally printed object via the printer, the wrapper enclosing the object based on dimension data of the wrapper automatically generated at the printer from the specifications of the object in the design data; and
    co-generating a three-dimensionally printed indicia on the wrapper including the information regarding the job ticket based on the access to label data from the data file.

13. The method of claim 12 wherein the co-generating the three-dimensionally printed indicia on the wrapper include printing an outwardly facing surface including the information.

* * * * *